United States Patent
Yin et al.

(10) Patent No.: US 10,334,212 B2
(45) Date of Patent: Jun. 25, 2019

(54) MEMORY AUXILIARY DEVICE AND METHOD, SPECTACLE FRAME AND PAIR OF SPECTACLES

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yanyan Yin, Beijing (CN); Falong Han, Beijing (CN); Yan Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 55 days.

(21) Appl. No.: 15/678,796

(22) Filed: Aug. 16, 2017

(65) Prior Publication Data

US 2018/0192010 A1    Jul. 5, 2018

(30) Foreign Application Priority Data

Jan. 3, 2017   (CN) .......................... 2017 1 0003226

(51) Int. Cl.
*H04N 7/18*    (2006.01)
*H04N 5/232*   (2006.01)
(Continued)

(52) U.S. Cl.
CPC ......... *H04N 7/188* (2013.01); *G02B 27/0172* (2013.01); *G02C 11/10* (2013.01);
(Continued)

(58) Field of Classification Search
CPC .............................. G06F 3/041; G06T 19/00
(Continued)

(56) References Cited

U.S. PATENT DOCUMENTS

| 10,133,407 | B2 * | 11/2018 | Kojima | .................... G06F 3/012 |
| 2014/0376491 | A1 | 12/2014 | Li et al. | |
| 2016/0041614 | A1 | 2/2016 | Mok et al. | |

FOREIGN PATENT DOCUMENTS

| CN | 101819334 A | 9/2010 |
| CN | 102393796 A | 3/2012 |

(Continued)

OTHER PUBLICATIONS

First Office Action for Chinese Application No. 201710003226.0, dated Jun. 6, 2018, 8 Pages.

*Primary Examiner* — Anand S Rao
(74) *Attorney, Agent, or Firm* — Brooks Kushman P.C.

(57) ABSTRACT

At least one embodiment of the present disclosure provides a memory auxiliary device and a memory auxiliary method, a spectacle frame and a pair of spectacles. The memory auxiliary device includes a first capturing module, a second capturing module and a processing module; wherein, the first capturing module is configured to capture an eye state, the processing module is configured to determine blink information according to the first image information of the eye state, and control an operating mode of the second capturing module according to the blink information, and the second capturing module is configured to capture a object in the operating mode controlled by the processing module, and send second image information of the captured object to the processing module for storage.

20 Claims, 8 Drawing Sheets

(51) Int. Cl.
| | |
|---|---|
| *G10L 15/22* | (2006.01) |
| *G10L 25/57* | (2013.01) |
| *G02C 11/00* | (2006.01) |
| *G02B 27/01* | (2006.01) |
| *G06F 3/16* | (2006.01) |
| *H04N 5/765* | (2006.01) |
| *H04N 5/77* | (2006.01) |
| *G10L 15/00* | (2013.01) |

(52) U.S. Cl.
CPC .............. *G06F 3/167* (2013.01); *G10L 15/22* (2013.01); *G10L 25/57* (2013.01); *H04N 5/23219* (2013.01); *H04N 5/23241* (2013.01); *H04N 5/23245* (2013.01); *H04N 5/23293* (2013.01); *H04N 5/765* (2013.01); *H04N 5/77* (2013.01); *G02B 2027/014* (2013.01); *G02B 2027/0138* (2013.01); *G02B 2027/0178* (2013.01); *G10L 15/00* (2013.01); *H04N 7/18* (2013.01)

(58) Field of Classification Search
USPC ..................................................... 348/51–60
See application file for complete search history.

(56) References Cited

FOREIGN PATENT DOCUMENTS

| | | | |
|---|---|---|---|
| CN | 104850217 A | 8/2015 | |
| CN | 105306082 A | 2/2016 | |

* cited by examiner

MEMORY AUXILIARY DEVICE AND METHOD, SPECTACLE FRAME AND PAIR OF SPECTACLES

CROSS-REFERENCE TO RELATED APPLICATION

The application claims priority to Chinese Patent Application No. 201710003226.0 filed on Jan. 3, 2017, which is incorporated herein by reference in its entirety.

TECHNICAL FIELD

The present disclosure relates to a field of intelligence technology, and in particular to a memory auxiliary device, a memory auxiliary method, a spectacle frame and a pair of spectacles with the spectacle frame.

BACKGROUND

With advance of science and technology, and improvements of living standards and work efficiency, people are exposed to many things every day, but are unable to remember all these things. In particular, forgetting an important thing may cause big trouble.

SUMMARY

At least one embodiment of the present disclosure provides a memory auxiliary device, a memory auxiliary method, and a spectacle frame and a pair of spectacles.

At least one embodiment of the present disclosure provides a memory auxiliary device, comprising a first capturing module, a second capturing module and a processing module; wherein, the first capturing module is configured to capture an eye state, and send image information of the eye state to the processing module; the processing module is configured to receive the first image information of the eye state sent by the first capturing module, determine blink information according to the first image information of the eye state, and control an operating mode of the second capturing module according to the blink information; the second capturing module is configured to capture an object in the operating mode controlled by the processing module, and send second image information of the captured object to the processing module for storage. Optionally, the blink information includes the number of blinks within a first predetermined time period.

Optionally, the processing module is configured to control the second capturing module to operate in a video recording mode in the case that the number of blinks within the first predetermined time period is less than a preset value.

Optionally, the processing module is configured to control the second capturing module to operate in a photographing mode in the case that the number of blinks within the first predetermined time period is greater than or equal to a preset value. Further, the processing module is further configured to delete the second image information sent by the second capturing module in the photographing mode after being stored for a second preset time period.

Optionally, the first capturing module is configured to capture the eye state in real time within the first predetermined time period, and send the first image information of the eye state to the processing module; the processing module is configured to take a stored picture in which a user opens or closes eyes for the first time at the beginning of the first predetermined time period as an original picture, and compare the first image information sent by the first capturing module within the first predetermined time period with image information of the original picture, to obtain the number of blinks within the first predetermined time period.

Optionally, the memory auxiliary device further includes a control button, the control button being connected with the processing module; wherein the processing module is further configured to disable the first capturing module and control the second capturing module to operate in a video recording mode, upon receiving a turn-on signal sent by the control button, and enable the first capturing module upon receiving a turn-off signal sent by the control button, wherein the operating mode of the second capturing module is determined by the number of blinks within the first predetermined time period.

Optionally, the second capturing module is further configured to capture voice information of the object.

Optionally, the memory auxiliary device further includes a communication module, the communication module being connected with the processing module; and the communication module is configured to send the second image information stored by the processing module to an external device.

At least one embodiment of the present disclosure further provides a spectacle frame, comprising: a pair of rims; a pair of temples; and any of the memory auxiliary devices described above; wherein the first capturing module is arranged at an inner side of the pair of the rims, and the second capturing module is arranged at an outer side of the pair of the rims.

Optionally, there are two first capturing modules respectively arranged at inner sides of a left rim and a right rim of the pair of the rims; and there are two second capturing modules respectively arranged at outer sides of a left rim and a right rim of the pair of the rims.

At least one embodiment of the present disclosure provides a pair of spectacles, comprising a pair of spectacle lenses and any of the spectacle frames described above, wherein the pair of spectacle lenses are display screens, configured to display the second image information stored by the processing module.

Optionally, the display screens are transparent display screens.

Optionally, the pair of spectacles further includes a speech recognition module arranged on the spectacle frame and a start button arranged at an outer side of the spectacle frame, wherein the speech recognition module is connected with the start button and the processing module; the start button is configured to start the speech recognition module through the processing module; the speech recognition module is configured to recognize voice information; and the processing module is further configured to send the second image information related to the voice information recognized by the speech recognition module to the display screens for display.

Optionally, the pair of spectacles further includes a sound playing module arranged on the spectacle frame, the sound playing module being connected with the processing module; wherein, the second capturing module is further configured to capture voice information while capturing the second image information, and send the captured voice information to the processing module. On this basis, the processing module is further configured to send the voice information captured in synchronization with the second image information to the sound playing module for playing, while sending the second image information to the display screens for display.

Further, the sound playing module is integrated into the speech recognition module.

Optionally, the pair of spectacles further includes a power supply device arranged on the spectacle frame, wherein the power supply device is configured to provide power to the display screens, the first capturing module, the second capturing module and the processing module.

Further, the pair of spectacles further includes an alerting module, wherein the alerting module is arranged on the spectacle frame, and connected with the processing module; and the processing module is further configured to control the alerting module to give an alarm for prompting, when power from the power supply device is insufficient.

At least one embodiment of the present disclosure provides a memory auxiliary method, comprising: capturing an eye state; determining blink information according to first image information of the eye state; determining an operating mode according to the blink information; and capturing an object in the determined operating mode, and storing second image information of the object.

Optionally, the blink information comprises the number of blinks within a first predetermined time period, and the determining the operating mode according to the blink information comprises: determining the operating mode as a video recording mode, when the number of blinks within the first predetermined time period is less than a preset value; or determining the operating mode as a photographing mode, when the number of blinks within the first predetermined time period is greater than or equal to a preset value.

BRIEF DESCRIPTION OF THE DRAWINGS

To illustrate technical solutions of embodiments of the present disclosure or the related art more clearly, a brief introduction will be given to drawings needed to describe the embodiments or the related art. Apparently, the drawings described below are merely some embodiments of the present disclosure. Based on these drawings, a person skilled in the art may obtain other drawings without any creative efforts.

REFERENCE SIGNS

01—spectacle frame 02—spectacle lens 03—rim 04—temple
10—first capturing module 20—second capturing module 30—processing module
40—speech recognition module 50—start button 60—sound playing module
70—control button 80—power supply device 90—alerting module
100—communication module

DETAILED DESCRIPTION

The technical solutions of the embodiments of the present disclosure will be described clearly and fully hereinafter in conjunction with the drawings of the embodiments of the present disclosure. Obviously, the described embodiments are merely a part of, rather than all of, the embodiments of the present disclosure. Based on the embodiments of the present disclosure, a person skilled in the art may obtain all other embodiments without any creative efforts, which fall within the scope of the present disclosure.

According to some embodiments of the present disclosure, a memory auxiliary device is provided, including a first capturing module, a second capturing module and a processing module.

The first capturing module is configured to capture an eye state, and send imaging information of the eye state to the processing module.

The processing module is configured to receive first image information of the eye state sent by the first capturing module, determine blink information according to the first image information of the eye state, and control an operating mode of the second capturing module according to the blink information.

The second capturing module is configured to capture an object in the operating mode controlled by the processing module, and send second image information of the captured object to the processing module for storage.

Optionally, the object may include a scene, picture or the like viewable by eyes currently.

According to some embodiments of the present disclosure, a spectacle frame is provided, including a pair of rims, a pair of temples and the above memory auxiliary device.

Optionally, the first capturing module may be arranged at an inner side of the pair of the rims, and the second capturing module is arranged at an outer side of the pair of the rims.

Figure 1:
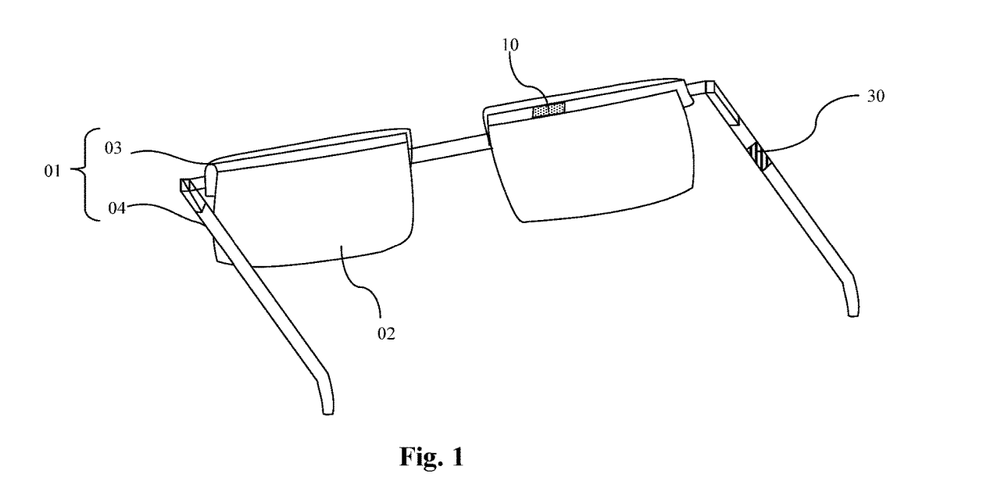
FIG. 1 is a schematic diagram of a pair of spectacles provided by at least one embodiment of the present disclosure.
Figure 2:
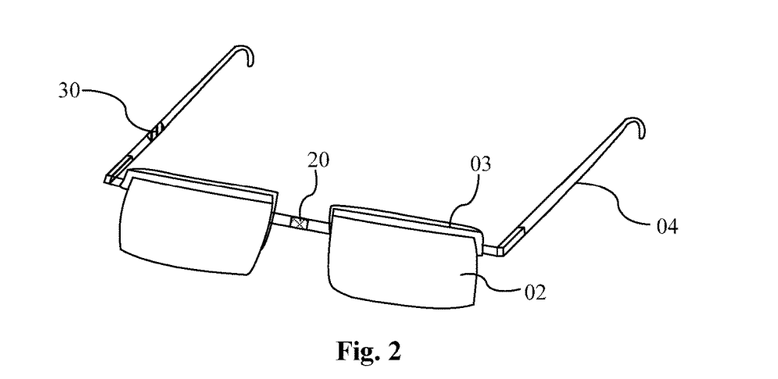
FIG. 2 is a schematic diagram of a pair of spectacles provided by at least one embodiment of the present disclosure.
Figure 3:
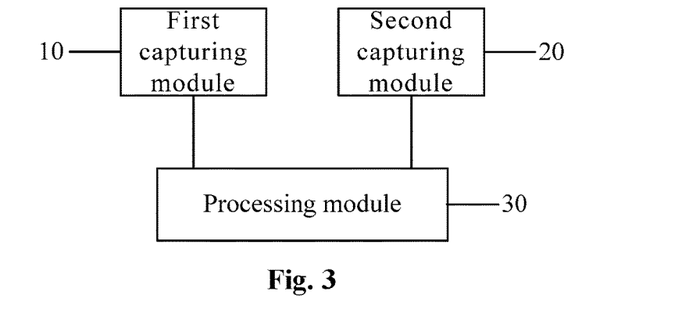
FIG. 3 is a schematic functional diagram of modules of a pair of spectacles provided by at least one embodiment of the present disclosure.

At least one embodiment of the present disclosure provides a pair of spectacles, as shown in FIGS. 1-3, including a spectacle frame 01 and a pair of spectacle lenses 02, wherein the spectacle frame 01 includes a pair of rims 03 and a pair of temples 04; and the spectacle lenses 02 are display screens.

The pair of spectacles further includes a first capturing module 10 arranged at an inner side of the pair of the rims 03, a second capturing module 20 arranged at an outer side of the pair of the rim 03, and a processing module 30 arranged on the spectacle frame 01.

The first capturing module 10 is configured to capture an eye state in real time, and send first imaging information of the captured eye state to the processing module 30.

The second capturing module 20 is configured to capture a thing (or an object) outside the pair of spectacles, and send second image information of the captured object outside the pair of spectacles to the processing module 30.

The processing module 30 is configured to obtain blink information (e.g., the number of blinks within a first predetermined time period or a blink frequency) according to the first image information sent by the first capturing module 10, and control an operating mode of the second capturing module 20 according to the blink information. Optionally, the blink information may further include a duration of one blink and a time interval between two successive blinks, etc.

The followings should be noted. Firstly, the spectacle frame 01 has an inner side and an outer side. When a user wears the pair of spectacles, a side close to eyes is the inner side, and the other side is the outer side.

Secondly, the first capturing module 10 has a specific location such that an eye state of at least one eye can be detected. For example, the first capturing module 10 may be arranged at the inner side of a rim 03. Specifically, the first capturing module may be arranged at a side toward an eye, of a top edge, or a bottom edge, or a side edge of the rim 03.

Here, to ensure aesthetics of the pair of spectacles, the first capturing module 10 is preferably a micro detection element.

Thirdly, the capturing module 20 has a specific location such that an object within a certain range outside the pair of spectacles can be captured.

Here, to ensure aesthetics of the pair of spectacles, the second capturing module 20 is preferably a micro detection element.

Fourthly, the processing module 30 may be arranged inside the spectacle frame 01 or on a surface of the spectacle frame 01. Optionally, the processing module 30 is arranged on a bridge of the pair of rims 03 or on a temple 04.

Fifthly, a time value of the first predetermined time period may be set as needed. When the first predetermined time period has different time values, the number of blinks varies, and thus the preset value may also be set as needed.

At least one embodiment of the present disclosure provides a pair of spectacles, wherein an eye state is captured using the first capturing module 10, such that the processing module 30 may obtain the number of blinks within the first predetermined time period on this basis, thereby controlling an operating mode of the second capturing module 20. As such, a user only needs to control a blink frequency of eyes when desiring to use the pair of spectacles to assist in recording a surroundings, and an operation mode of the second capturing module 20 may be controlled, thereby enabling the recording of the surroundings by the pair of spectacles.

Figure 4:
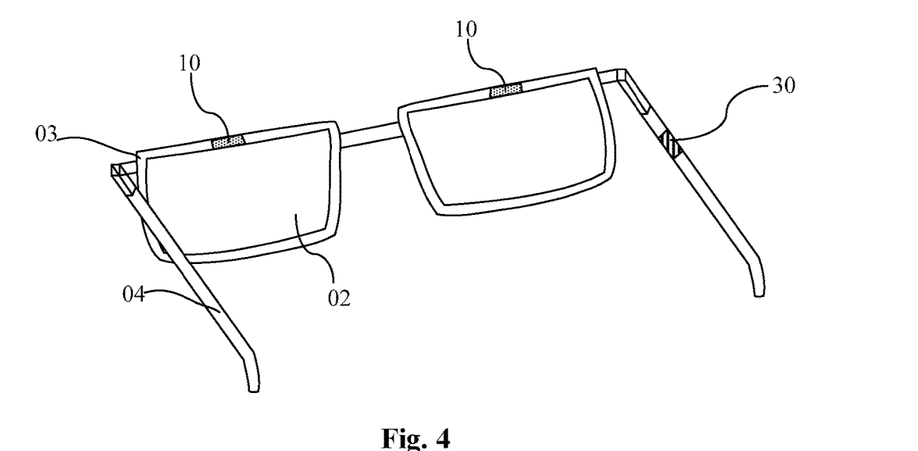
FIG. 4 is a schematic diagram of a pair of spectacles provided by at least one embodiment of the present disclosure.
Figure 5:
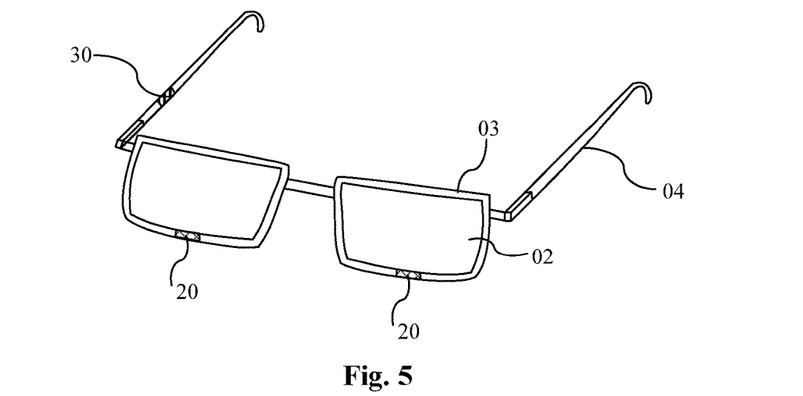
FIG. 5 is a schematic diagram of a pair of spectacles provided by at least one embodiment of the present disclosure.

In some embodiments, as shown in FIG. 4, the first capturing modules 10 are respectively arranged at inner sides of a left rim and a right rim of the pair of the rims 03. As shown in FIG. 5, the second capturing modules 20 are respectively arranged at outer sides of a left rim and a right rim of the pair of the rims 03.

The first capturing modules 10 may be micro cameras or image sensors; and the second capturing modules 20 may be micro cameras or image sensors.

In at least one embodiment of the present disclosure, by respectively arranging the first capturing modules 10 at inner sides of a left rim and a right rim of the pair of the rims 03, a more complete eye state can be captured, which makes the number of blinks that the processing module 30 finally obtains statistically more accurate. By respectively arranging the second capturing modules 20 at outer sides of a left rim and a right rim of the pair of the rims 03, a picture within a certain range can be captured by each of the second capturing modules 20, and thus after the processing of the processing module 30, a user can obtain objects within a broader range surrounding the pair of spectacles.

Further, the processing module 30 may be arranged inside the spectacle frame 01. The processing module 30 may be a central processing unit (Central Processing Unit, CPU), or an embedded system on chip (System on Chip, SOC), or an advanced reduced instruction set processor (Advanced RISC Machines, ARM).

In some embodiments, the display screen is a transparent display screen.

The transparent display screen includes a liquid crystal transparent display screen, an OLED (Organic Light-Emitting Diode) transparent display screen, etc.

A display surface of the display screen should be close to eyes of a user.

In at least one embodiment of the present disclosure, by employing a transparent display screen as the display screen, on the one hand, the pair of spectacles is more aesthetic; on the other hand, a user can also observe a surrounding through the transparent display screen, so as to directly capture the surroundings through the transparent display screen when it is not desired to view content displayed on the transparent screen or there is no need to display on the transparent screen.

In some embodiments, controlling, by the processing module 30, the operating mode of the second capturing module 20 according to the number of blinks within the first predetermined time period, includes: when the number of blinks within the first predetermined time period is less than a preset value, controlling, by the processing module 30, the second capturing module 20 to operate in a video recording mode and storing the second image information sent by the second capturing module 20 in the video recording mode.

It should be noted that, for a normal person in different states, the number of blinks within the first predetermined time period varies (e.g., in a normal state, the number of blinks per minute is approximately between 15-21; in a relaxed state, a blink rate will be slower and the number of blinks per minute is generally between 8-12; when tired, eyes will be in a rest state and there is almost no blink). To ensure that the video recording mode of the second capturing module 20 is not be triggered randomly, the preset value is required to be as small as possible. For example, the preset value may be a minimum number of blinks of a normal person in a relaxed state within the first predetermined time period.

As an example, the first predetermined time period may be 1 minute, and the preset value may be 8.

In at least one embodiment of the present disclosure, when the number of blinks within the first predetermined time period is less than the preset value, the second capturing module 20 is controlled to operate in the video recording mode, and an object outside the pair of spectacles, captured by the second capturing module 20 in the video recording mode, is stored, for displaying through the spectacle lenses 20 of the display screen as required by a user, such that the user acquires the object he want to know.

In some embodiments, the processing module 30 is further configured to control the second capturing module 20 to operate in a photographing mode, when the number of blinks within the first predetermined time period is greater than or equal to the preset value; and automatically delete second image information sent by the second capturing module 20 in the photographing mode after storing for second preset time period.

Since a user is considered to be in a normal state when the number of blinks within the first predetermined time period is greater than or equal to the preset value, and the user may record a surrounding object by himself at this point, the second capturing module 20 may only operate in the photographing mode, and the processing module 30 automatically deletes the second image information sent by the second capturing module 20 in the photographing mode after storing for the second preset time period, thereby saving more space to store second image information sent by the second capturing module 20 in the video recording mode.

In some embodiments, when the blink frequency is less than a preset blink frequency, the processing module 30 controls the second capturing module 20 to operate in the video recording mode, and when the blink frequency is greater than or equal to the preset blink frequency, the processing module 30 controls the second capturing module 20 to operate in the photographing mode.

Figure 6:
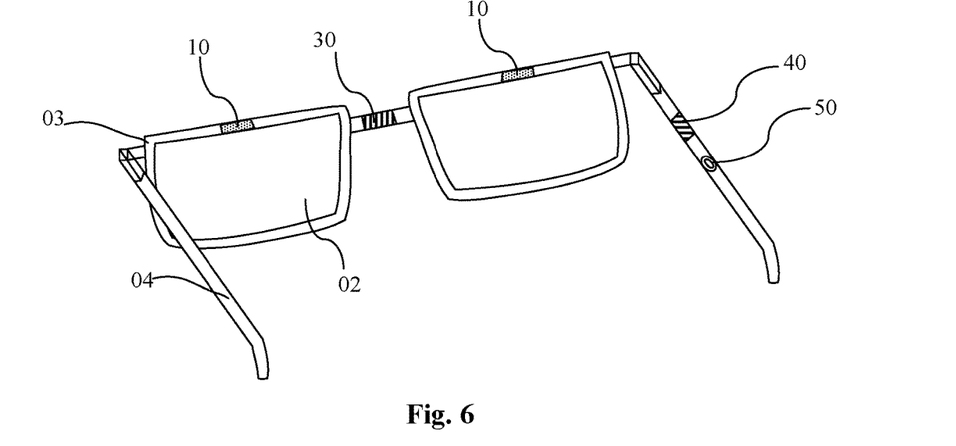
FIG. 6 is a schematic diagram of a pair of spectacles provided by at least one embodiment of the present disclosure.
Figure 7:
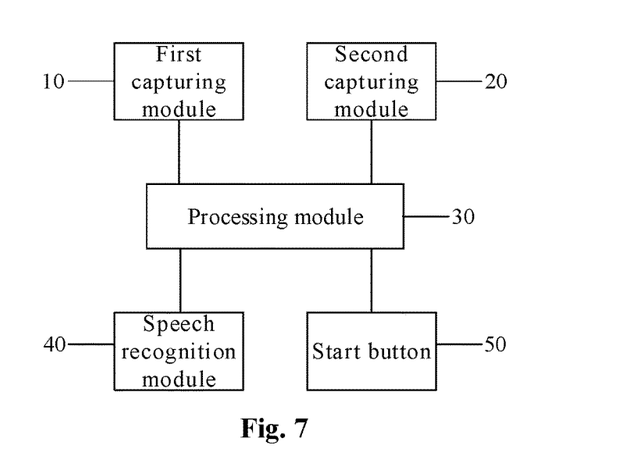
FIG. 7 is a schematic functional diagram of modules of a pair of spectacles provided by at least one embodiment of the present disclosure.

In some embodiments, as shown in FIGS. 6 and 7, the pair of spectacles further includes a speech recognition module 40 arranged on the spectacle frame 01 and a start button 50 arranged at an outer side of the spectacle frame 01; wherein the speech recognition module 40 is connected with the start button 50 and the processing module 30.

Wherein, the start button 50 is configured to start the speech recognition module 40 through the processing module 30; and the speech recognition module 40 is configured to recognize voice information.

On this basis, the processing module 30 is further configured to send second image information related to voice information recognized by the speech recognition module 40 to the display screen for display, according to the voice information.

Here, the operating process of the start button 50, the speech recognition module 40 and the processing module 30 is: a user presses the start button 50 and says a voice prompt; the speech recognition module 40 recognizes the voice prompt; and the processing module 30 finds second image information related to voice information recognized by the speech recognition module 40 according to the voice information, and sends the second image information to the display screen for display.

Here, to ensure aesthetics of the pair of spectacles, the speech recognition module 40 is preferably a micro recognition element. The start button 50 may be arranged on the temple 04.

The followings should be noted. Firstly, the speech recognition module 40 is configured such that at least a simple voice prompt can be recognized.

Secondly, before the second image information is sent to the display screen for display, electro-optical conversion needs to be performed on the second image information.

An electro-optical converter may be integrated into the second capturing module 20, or may be integrated into the processing module 30. Of course, the electro-optical converter may also be arranged separately. The second image information captured by the second capturing module 20 is firstly sent to the electro-optical converter, and is then sent to the processing module 30 after conversion.

In at least one embodiment of the present disclosure, by arranging the start button 50 and the speech recognition module 40, relevant content can be displayed by the display screen according to a voice prompt of a user, which is more practical.

Figure 8:
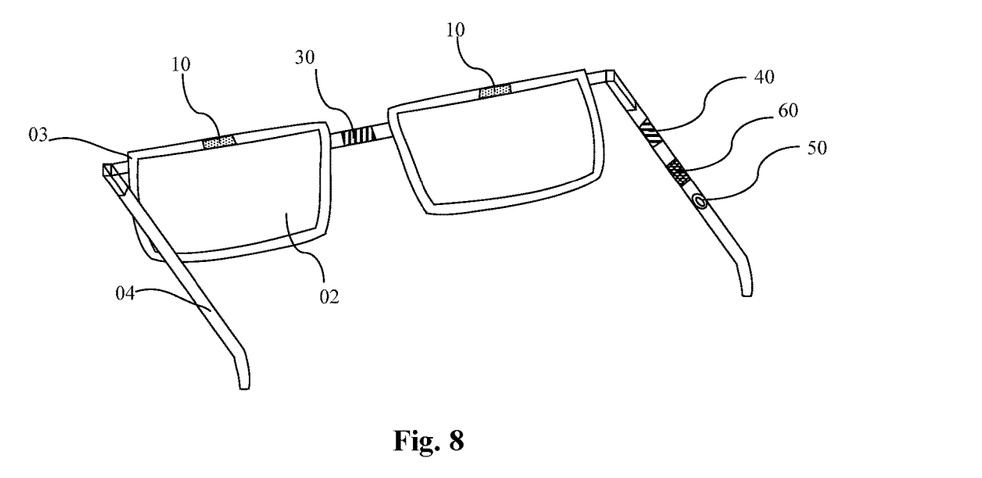
FIG. 8 is a schematic diagram of a pair of spectacles provided by at least one embodiment of the present disclosure.
Figure 9:
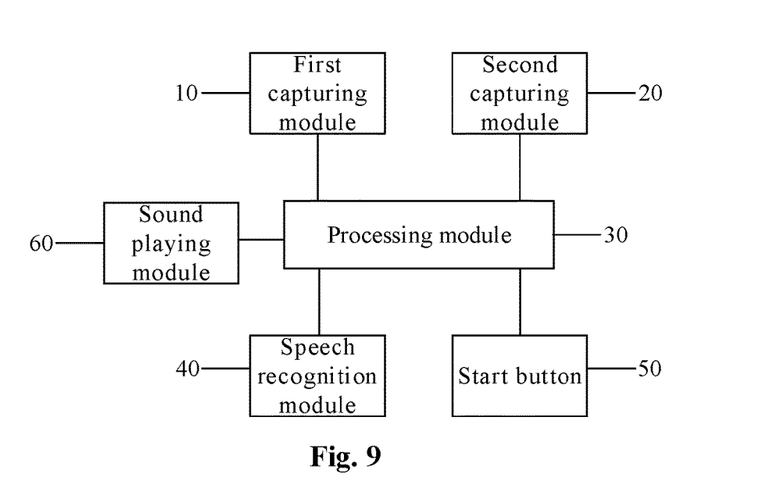
FIG. 9 is a schematic functional diagram of modules of a pair of spectacles provided by at least one embodiment of the present disclosure.

In some embodiments, as shown in FIGS. 8 and 9, the pair of spectacles further includes a sound playing module 60 arranged on the spectacle frame 01, wherein the sound playing module 60 is connected with the processing module 30.

In this case, the second capturing module 20 is further configured to capture voice information while capturing the second image information and send the captured voice information to the processing module 30. On this basis, the processing module 30 further sends the sound information captured in synchronization with the second image information to the sound playing module 60 for playing, while sending the second image information to the display screen for display.

In at least one embodiment of the present disclosure, the second capturing module 20 captures voice information while capturing the second image information, such that the sound playing module 60 can play voice information while the display screen displays the second image information, thereby helping a user record details of the surroundings.

In some embodiments, the sound playing module 60 is integrated into the speech recognition module 40.

Thus, it is easy to arrange on the spectacle frame 01 of the pair of spectacles.

Figure 10:
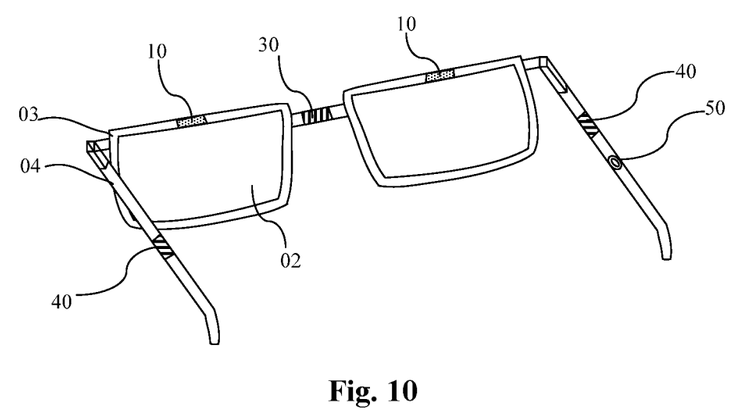
FIG. 10 is a schematic diagram of a pair of spectacles provided by at least one embodiment of the present disclosure.

In some embodiments, as shown in FIG. 10, the speech recognition modules 40 may be respectively arranged on the pair of temples 04.

Thus, recognition rate of a voice uttered by a user can be improved.

In some embodiments, the processing module 30 is configured to obtain the number of blinks within the first predetermined time period according to the first image information sent by the first capturing module 10. Specifically, the processing module 30 is configured to store a picture in which eyes are normally open or closed when a user wears the pair of spectacles for the first time as an original picture; and compare the first image information sent by the first capturing module 10 within the first predetermined time period with image information of the original picture to obtain the number of blinks within the first predetermined time period.

In at least one embodiment of the present disclosure, by storing a picture in which eyes are normally open or closed when a user wears the pair of spectacles for the first time as an original picture, and comparing first image information of an eye state subsequently captured with the original picture, an eye state represented by the first image information captured every time can be obtained, thereby making determination of the eye state more accurate.

As an example, the first capturing module 10 may be a micro timing camera. By setting a timed period (that is the same as the time value of the first predetermined time period), an eye state can be captured by the first capturing module 10 in real time within the timed period.

On this basis, a counter in the processing module 30 may determine the eye state captured within the timed period, to statistically obtain the number of blinks.

Figure 11:
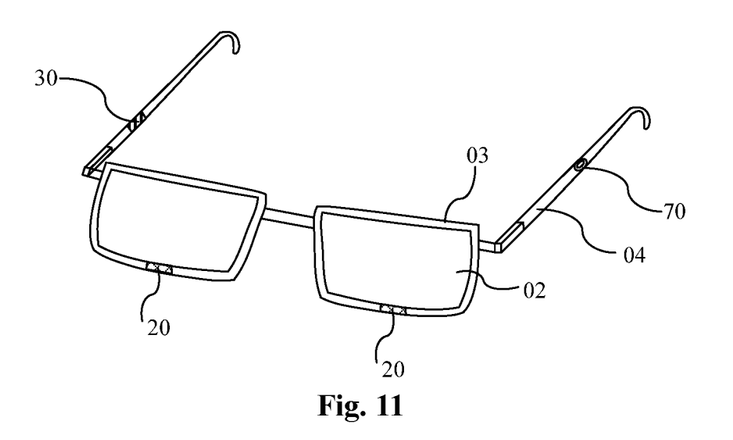
FIG. 11 is a schematic diagram of a pair of spectacles provided by at least one embodiment of the present disclosure.

In some embodiments, as shown in FIG. 11, the pair of spectacles further includes a control button 70 arranged at an outer side of the spectacle frame, wherein the control button 70 is connected with the processing module 30. On this basis, the processing module 30 is further configured to disable the first capturing module 10 and control the second capturing module 20 to operate in a video recording mode, upon receiving a turn-on signal sent by the control button 70; and to enable the first capturing module 10 upon receiving a turn-off signal sent by the control button 70, wherein the operating mode of the second capturing module 20 is determined by the number of blinks.

The control button 70 may be arranged on a temple 04.

It should be noted that, when the control button 70 is not pressed, that is, after the processing module 30 receives the turn-off signal sent by the control button 70, the first capturing module 10 and the second capturing module 20 may be operate in an original operating mode.

In at least one embodiment of the present disclosure, by arranging a control button 70, the control button 70 can be pressed by a user as needed, such that the processing module 30 directly controls the second capturing module 20 to operate in a video recording mode upon receiving the turn-on signal sent by the control button 70, without triggering, by the number of blinks, the second capturing module 20 to operate in a video recording mode, thereby providing a broader range of applicability of the pair of spectacles. Furthermore, the first capturing module 10 is disabled when the control button 70 is pressed, thereby saving power.

Figure 12:
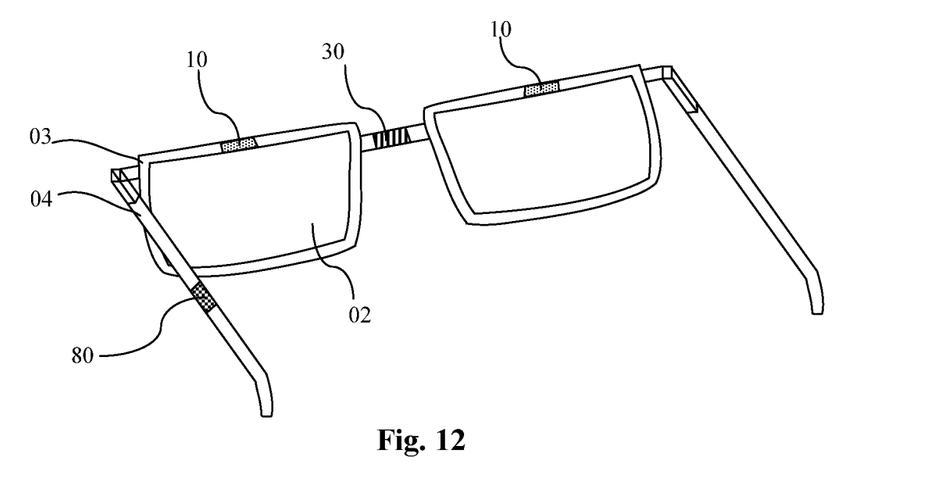
FIG. 12 is a schematic diagram of a pair of spectacles provided by at least one embodiment of the present disclosure.
Figure 13:
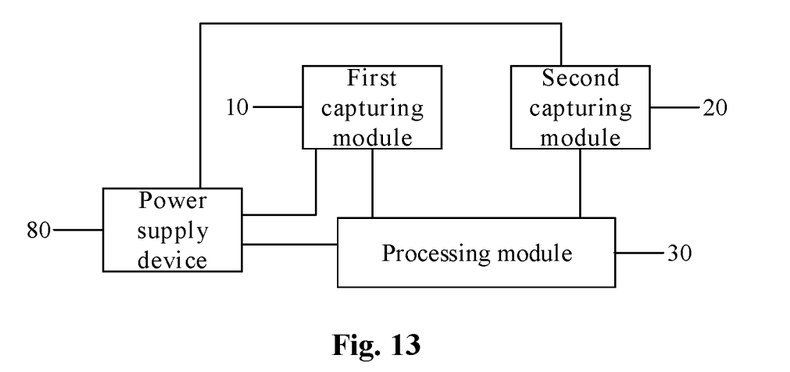
FIG. 13 is a schematic functional diagram of modules of a pair of spectacles provided by at least one embodiment of the present disclosure.

In some embodiments, as shown in FIGS. 12 and 13, the pair of spectacles further includes a power supply device 80 arranged on the spectacle frame 01, wherein the power supply device 80 provide power to the display screen, the first capturing module 10, the second capturing module 20 and the processing module 30.

Figure 14:
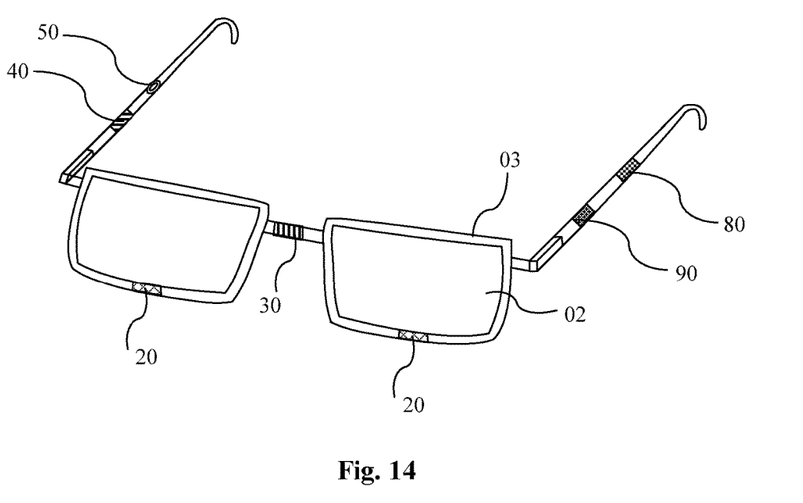
FIG. 14 is a schematic diagram of a pair of spectacles provided by at least one embodiment of the present disclosure.
Figure 15:
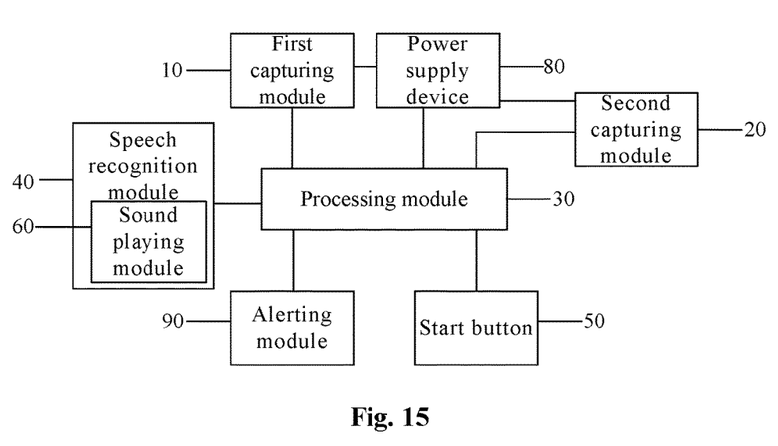
FIG. 15 is a schematic functional diagram of modules of a pair of spectacles provided by at least one embodiment of the present disclosure.

In some embodiments, as shown in FIGS. 14 and 15, the pair of spectacles further includes an alerting module 90, wherein the alerting module 90 is connected with processing module 30. On this basis, the processing module 30 is further configured to control the alerting module 90 to give an alarm in case of insufficient power supply from the power supply device 80.

Here, the alerting module 90 may be arranged on a surface of the pair of temples 04 or inside the pair of temples 04.

Wherein, the alerting module 90 may employ an alarm light or buzzer. When the alerting module 90 is an alarm light, the alerting module 90 is arranged on an outer surface of the pair of temples 04. When the alerting module 90 is a buzzer, the alerting module 90 may be arranged on an outer surface of the pair of temples 04, or may be arranged inside the pair of temples 04.

In at least one embodiment of the present disclosure, when power from the power supply device 80 is insufficient, the alerting module 90 is controlled to give an alarm for prompting, and thus it is avoided that the pair of spectacles cannot operate normally due to shortage of power supply to the pair of spectacles.

Figure 16:
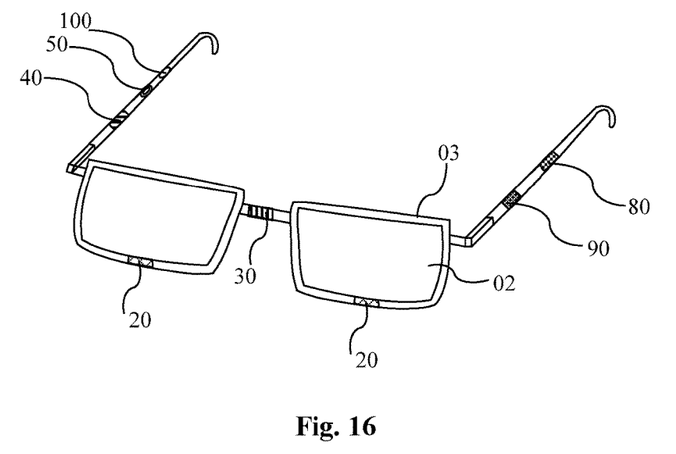
FIG. 16 is a schematic diagram of a pair of spectacles provided by at least one embodiment of the present disclosure.
Figure 17:
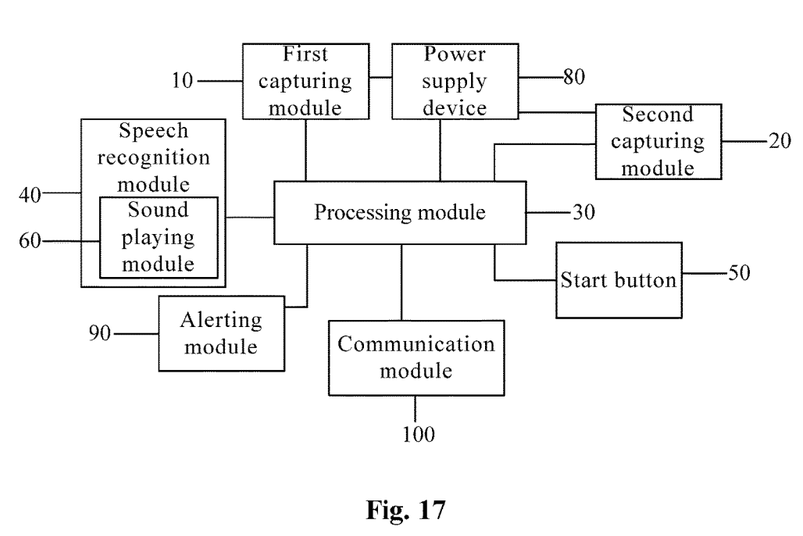
FIG. 17 is a schematic functional diagram of modules of a pair of spectacles provided by at least one embodiment of the present disclosure.

In some embodiments, as shown in FIGS. 16 and 17, the pair of spectacles further includes a communication module 100 arranged on the spectacle frame 01, wherein the communication module 100 is connected with the processing module 30; and the communication module 100 is configured to cause the processing module 30 to communicate with an external device.

The communication module 100 may employ bluetooth or a wireless network (Wireless-Fidelity, Wi-Fi).

The external device may be a computer, a mobile phone, a tablet computer, or the like.

In at least one embodiment of the present disclosure, the communication module 100 is arranged to establish a communication connection with the external device, so as to set relevant parameters through the external device and export relevant content, etc., which improves user experience.

At least one embodiment of the present disclosure provides a memory auxiliary method, including: capturing an eye state; determining blink information according to first image information of the eye state; determining an operating mode according to the blink information; and capturing an object in the determined operating mode and storing second image information of the object.

Optionally, the blink information includes the number of blinks within first determined time period. When the number of blinks during the first determined time period is less than a preset value, the operating mode is determined as a video recording mode; or when the number of blinks during the first determined time period is greater than or equal to a preset value, the operating mode is determined as a photographing mode.

The above memory auxiliary method may be implemented by the memory auxiliary device arranged on the spectacle frame, and specific embodiments will not be described repeatedly here.

It should be understood for a person skilled in the art that, all or part of steps implementing the above method embodiments may be completed by hardware related to program instructions. The foregoing program may be stored in computer readable storage media, wherein when the program is executed, steps including the above method embodiments are performed; and the foregoing storage media include various media that may store program code, such as ROM, RAM, magnetic disk, optical disk or the like.

The above is merely the specific embodiments of the present disclosure, and the scope of the present disclosure is not limited to this. For a person skilled in the art, changes or substitutions may be conceivable readily within the technical scope disclosed by the present disclosure, which shall fall within the scope of the present disclosure. Thus, the scope of the present disclosure should be subject to the scope of the claims.

What is claimed is:

1. A memory auxiliary device, comprising a first capturing module, a second capturing module and a processing module; wherein,
   the first capturing module is configured to capture an eye state, and send first image information of the eye state to the processing module; and
   the processing module is configured to receive the first image information of the eye state sent by the first capturing module, determine blink information according to the first image information of the eye state, and control an operating mode of the second capturing module according to the blink information;

the second capturing module is configured to capture an object in the operating mode controlled by the processing module, and send second image information of the captured object to the processing module for storage;

the blink information comprises a blink frequency; and the processing module is configured to control the second capturing module to operate in a first mode in the case that the blink frequency is less than a preset blink frequency, and control the second capturing module to operate in a second mode in the case that the blink frequency is greater than or equal to the preset blink frequency.

2. The memory auxiliary device according to claim 1, wherein the blink frequency is a quantity of blinks within a first predetermined time period, and the preset blink frequency is a preset quantity of blinks within the first predetermined time period.

3. The memory auxiliary device according to claim 1, wherein the first mode is a video recording mode, and the second mode is a photographing mode.

4. The memory auxiliary device according to claim 3, wherein the processing module is further configured to:
delete the second image information sent by the second capturing module in the photographing mode after being stored for a second preset time period.

5. The memory auxiliary device according to claim 2, wherein:
the first capturing module is further configured to capture the eye state in real time within the first predetermined time period, and send the first image information of the eye state to the processing module; and
the processing module is further configured to take a stored picture in which a user opens or closes eyes for the first time at the beginning of the first predetermined time period as an original picture, and compare the first image information sent by the first capturing module within the first predetermined time period with image information of the original picture, to obtain the quantity of blinks within the first predetermined time period.

6. The memory auxiliary device according to claim 2, further comprising a control button, the control button being connected with the processing module, wherein
the processing module is further configured to disable the first capturing module and control the second capturing module to operate in a video recording mode, upon receiving a turn-on signal sent by the control button, and enable the first capturing module upon receiving a turn-off signal sent by the control button, wherein the operating mode of the second capturing module is determined by the quantity of blinks within the first predetermined time period.

7. The memory auxiliary device according to claim 1, wherein the second capturing module is further configured to capture voice information of the object.

8. The memory auxiliary device according to claim 1, wherein:
the memory auxiliary device further comprises a communication module, the communication module being connected with the processing module; and
the communication module is configured to send the second image information stored by the processing module to an external device.

9. A spectacle frame, comprising:
a pair of rims;
a pair of temples; and
the memory auxiliary device according to claim 1;
wherein the first capturing module is arranged at an inner side of the pair of the rims, and the second capturing module is arranged at an outer side of the pair of the rims.

10. The spectacle frame according to claim 9, wherein there are two first capturing modules respectively arranged at inner sides of a left rim and a right rim of the pair of the rims; and there are two second capturing modules respectively arranged at outer sides of a left rim and a right rim of the pair of the rims.

11. A pair of spectacles, comprising a pair of spectacle lenses and the spectacle frame according to 10, wherein the pair of spectacle lenses are display screens, configured to display the second image information stored by the processing module.

12. The pair of spectacles according to claim 11, wherein the display screens are transparent display screens.

13. The pair of spectacles according to claim 11, further comprising:
a speech recognition module arranged on the spectacle frame and a start button arranged at an outer side of the spectacle frame; wherein:
the speech recognition module is connected with the start button and the processing module;
the start button is configured to start the speech recognition module through the processing module;
the speech recognition module is configured to recognize voice information; and
the processing module is further configured to send the second image information related to the voice information recognized by the speech recognition module to the display screens for display.

14. The pair of spectacles according to claim 13, further comprising a sound playing module arranged on the spectacle frame, the sound playing module being connected with the processing module; wherein,
the second capturing module is further configured to capture voice information while capturing the second image information, and send the captured voice information to the processing module; and
the processing module is further configured to send the voice information captured in synchronization with the second image information to the sound playing module for playing, while sending the second image information to the display screens for display.

15. The pair of spectacles according to claim 14, wherein the sound playing module is integrated into the speech recognition module.

16. The pair of spectacles according to claim 11, further comprising:
a power supply device arranged on the spectacle frame, wherein the power supply device is configured to provide power to the display screens, the first capturing module, the second capturing module and the processing module; and
an alerting module, wherein the alerting module is arranged on the spectacle frame and connected with the processing module, and the processing module is further configured to control the alerting module to give an alarm in case of insufficient power supply from the power supply device.

17. A memory auxiliary method, comprising:
capturing an eye state;
determining blink information according to first image information of the eye state; determining an operating mode according to the blink information; and capturing an object in the determined operating mode, and storing second image information of the object;

the blink information comprises a blink frequency; and determining the operating mode according to the blink information comprises: determining a first mode as the operating mode in the case that the blink frequency is less than a preset blink frequency, and determining a second mode as the operating mode in the case that the blink frequency is greater than or equal to the preset blink frequency.

18. The memory auxiliary method according to claim 17, wherein the first mode is a video recording mode, and the second mode is a photographing mode.

19. The memory auxiliary device according to claim 1, wherein the preset blink frequency is greater than or equal to 8 times per minute and is less than or equal to 21 times per minute.

20. The memory auxiliary device according to claim 2, wherein the first predetermined time period is 1 minute, and the preset quantity of blinks is greater than or equal to 8 and is less than or equal to 21.

* * * * *